United States Patent
Meyer et al.

(10) Patent No.: US 10,801,848 B2
(45) Date of Patent: *Oct. 13, 2020

(54) CROWD SOURCING TO PREDICT VEHICLE ENERGY CONSUMPTION

(71) Applicant: FORD GLOBAL TECHNOLOGIES, LLC, Dearborn, MI (US)

(72) Inventors: Jason Meyer, Canton, MI (US); Ryan Abraham McGee, Shanghai (CN); Fling Finn Tseng, Ann Arbor, MI (US); Johannes Geir Kristinsson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 710 days.

This patent is subject to a terminal disclaimer.

(21) Appl. No.: 14/341,069

(22) Filed: Jul. 25, 2014

(65) Prior Publication Data

US 2016/0025508 A1    Jan. 28, 2016

(51) Int. Cl.
*G01C 21/34*   (2006.01)
*G01C 21/20*   (2006.01)

(52) U.S. Cl.
CPC ..... *G01C 21/3469* (2013.01); *G01C 21/3407* (2013.01)

(58) Field of Classification Search
CPC ... G06F 17/30241; H04W 4/027; H04W 4/02; H04W 4/046; H04W 4/003; H04W 4/021;
(Continued)

(56) References Cited

U.S. PATENT DOCUMENTS

| 4,838 | A | 11/1846 | McKinzie |
| 60,469 | A | 12/1866 | Bosworth |

(Continued)

FOREIGN PATENT DOCUMENTS

| CN | 102023018 | 4/2011 |
| CN | 103597317 | 2/2014 |

OTHER PUBLICATIONS

Joerg, Niesenhaus, Playful Crowdsourcing for Energy-Efficient Automotive Navigation, paper, ©2011, pp. 1-4, Authors & Digital Games Research Association DiGRA, University of Duisburg-Essen Dept. of Computer Science and Applied Cognitive Science, Forsthausweg 2, 47057 Duisburg, Germany.

(Continued)

*Primary Examiner* — Tuan C To
*Assistant Examiner* — Paul A Castro
(74) *Attorney, Agent, or Firm* — Carlson, Gaskey & Olds, P.C.

(57) ABSTRACT

An example method of crowd-sourcing energy consumption data for vehicles includes controlling a vehicle in response to a predicted energy consumption that is continually updated based on a difference between a previous predicted energy consumption and a previous actual base energy consumption. Another example method of routing a vehicle includes changing a route for a vehicle in response to a predicted energy consumption for the vehicle when travelling the route, the predicted energy consumption based on a difference between a previous predicted energy consumption and a previous actual base energy consumption.

20 Claims, 4 Drawing Sheets

(58) Field of Classification Search
CPC ..... H04W 84/12; H04W 24/00; H04W 48/18;
H04W 4/023; H04W 4/025; H04W 4/04;
H04W 4/12; H04W 72/06; H04W 72/085;
H04W 12/02; H04W 12/04; H04W 12/06;
H04W 12/08; H04W 12/10; H04W 12/12;
H04W 24/02; H04W 24/06; H04W 24/08;
H04W 28/0215; H04W 28/06; H04W
28/26; H04W 36/08; H04W 36/14; H04W
36/245; H04W 40/02; H04W 40/20;
H04W 40/242; H04W 48/02; H04W
48/06; H04W 48/20; H04W 4/00; H04W
4/001; H04W 4/005; H04W 4/006; H04W
4/008; H04W 4/026; H04W 4/10; H04W
4/18; H04W 4/206; H04W 52/0209;
H04W 52/0225; H04W 52/0229; H04W
52/0251; H04W 52/0254; H04W 52/12;
H04W 52/143; H04W 52/225; H04W
52/241; H04W 52/346; H04W 64/00;
H04W 72/0406; H04W 72/042; H04W
72/048; H04W 72/0493; H04W 74/0816;
H04W 76/005; H04W 76/026; H04W
80/02; H04W 84/005; H04W 88/02;
H04W 88/04; H04W 88/06; H04W 8/02;
H04W 8/06; H04W 8/08; H04W 8/20;
H04W 8/26; H04W 92/18; G01C
21/3697; G01C 21/34; G01C 21/3407;
G01C 21/3415; G01C 21/20; G01C
21/26; G01C 21/3438; G01C 21/3446;
G01C 21/3469; G01C 21/3484; G01C
21/36; G01C 21/3605; G01C 21/3626;
G01C 21/00; G01C 21/206; G01C 21/32;
G01C 21/343; G01C 21/3461; G01C
21/362; G01C 21/3667; G01C 21/3676;
G01C 5/06; H04L 63/1416; H04L 67/12;
H04L 43/10; H04L 63/1433; H04L 69/18;
H04L 12/16; H04L 12/24; H04L 12/266;
H04L 12/2814; H04L 12/2818; H04L
12/282; H04L 1/008; H04L 29/06578;
H04L 41/0803; H04L 41/0816; H04L
41/0883; H04L 41/12; H04L 41/147;
H04L 41/22; H04L 43/067; H04L
43/0811; H04L 43/0876; H04L 45/12;
H04L 51/02; H04L 61/2592; H04L 63/08;
H04L 63/107; H04L 63/14; H04L
63/1466; H04L 67/02; H04L 67/06; H04L
67/10; H04L 67/125; H04L 67/141; H04L
67/22; H04L 67/2842; H04L 67/303;
H04L 67/306; H04L 67/32; H04L 67/34;
H04L 9/3231; H04L 9/3271
See application file for complete search history.

(56) References Cited

U.S. PATENT DOCUMENTS

| | | | |
|---|---|---|---|
| 166,774 | A | 8/1875 | Hart |
| 232,783 | A | 9/1880 | Tripler |
| 309,926 | A | 12/1884 | Chapman |
| 5,913,917 | A | 6/1999 | Murphy |
| 6,005,494 | A | 12/1999 | Schramm |
| 7,369,938 | B2 | 5/2008 | Scholl |
| 7,493,209 | B1 | 2/2009 | Altrichter et al. |
| 7,512,486 | B2 | 3/2009 | Needham et al. |
| 8,135,538 | B2 | 3/2012 | Geelen et al. |
| 8,554,473 | B2 | 10/2013 | Arcot et al. |
| 9,046,379 | B2 * | 6/2015 | Mineta ............... G01C 21/3469 |
| 2011/0307166 | A1 * | 12/2011 | Hiestermann .......... G01C 21/32 701/119 |
| 2012/0271542 | A1 * | 10/2012 | Arcot ................. G01C 21/3492 701/411 |
| 2014/0136089 | A1 * | 5/2014 | Hranac ................ G08G 1/0962 701/118 |
| 2014/0214267 | A1 * | 7/2014 | Sellschopp ............. G06F 17/00 701/34.2 |
| 2015/0276420 | A1 | 10/2015 | McGee et al. |

OTHER PUBLICATIONS

Oehlerking, Austin Louis, StreetSmart: Modeling Vehicle Fuel Consumption with Mobile Phone Sensor Data through a Participatory Sensing Framework, paper, ©Sep. 2011, pp. 1-109, Massachusetts Institute of Technology, 77 Massachusetts Avenue. Cambridge, MA 02139-4307. Accessible at: http://hdl.handle.net/1721.1/68950.

* cited by examiner

CROWD SOURCING TO PREDICT VEHICLE ENERGY CONSUMPTION

BACKGROUND

Vehicle energy consumption can be affected by a number of factors, such as traffic, road conditions, weather, wind speed and direction, etc. These factors may have day-to-day variations that must be compensated for to accurately predict vehicle energy consumption.

The predicted energy consumption of electrified vehicles, such as hybrid-electric vehicles, may be used to determine, for example, a time point at which to switch from electric to engine power or whether a battery charge is sufficient to travel a desired route.

SUMMARY

A method according to an exemplary aspect of the present disclosure includes, among other things, controlling a vehicle in response to a predicted energy consumption that is continually updated based on a difference between a previous predicted energy consumption and a previous actual base energy consumption.

In a further non-limiting embodiment of the foregoing method, the predicted energy consumption is additionally based on an energy consumption model.

In a further non-limiting embodiment of any of the foregoing methods, the method further comprises updating the energy consumption model in response to the difference.

In a further non-limiting embodiment of any of the foregoing methods, the controlling includes selecting a route for the vehicle to travel from a starting position to a destination, the route selected from a plurality of possible routes.

In a further non-limiting embodiment of any of the foregoing methods, the method further comprises calculating a current location of the vehicle and using the current location as the starting position for the route.

In a further non-limiting embodiment of any of the foregoing methods, the method further comprises calculating a current road segment based on the current location of the vehicle.

In a further non-limiting embodiment of any of the foregoing methods, the controlling includes controlling the vehicle in response to identifying information about the vehicle, time, location, a road segment, or some combination of these.

In a further non-limiting embodiment of any of the foregoing methods, the controlling of the vehicle is further in response to at least one of a characteristic of the vehicle or a characteristic of a driver of the vehicle.

A method according to another exemplary aspect of the present disclosure includes, among other things, changing a route for a vehicle in response to a predicted energy consumption for the vehicle when travelling the route, the predicted energy consumption based on a difference between a previous predicted energy consumption and a previous actual base energy consumption.

In a further non-limiting embodiment of the foregoing method, the method includes dividing the route into a set of road segments, and performing the changing step for each road segment in the set of road segments.

In a further non-limiting embodiment of any of the foregoing methods, the changing includes calculating a relevancy factor based on a first set of data entries corresponding to roads along the route and a second set of data entries corresponding to roads similar to the roads along the route.

In a further non-limiting embodiment of any of the foregoing methods, the calculating is with respect to one or more characteristics of the roads along the route.

In a further non-limiting embodiment of any of the foregoing methods, the characteristics include at least one of a geographical location, speed limit, number of lanes, road classification, number of traffic lights or stop signs.

In a further non-limiting embodiment of any of the foregoing methods, calculating the relevancy factor is with respect to a time since the data entries were collected.

In a further non-limiting embodiment of any of the foregoing methods, a predetermined number of data entries with the highest relevancy factor are used in the predicting step.

In a further non-limiting embodiment of any of the foregoing methods, the method includes changing the route to the most energy-efficient route.

A system according to yet another exemplary aspect of the present disclosure includes, among other things, a crowd of vehicles, a server in communication with the crowd of vehicles, and a database on the server. At least one of the server and database collect data corresponding to vehicle energy consumption from the crowd of vehicles, update the data in the database, and provide data corresponding to vehicle energy consumption to the crowd of vehicles.

In a further non-limiting embodiment of the foregoing system, the vehicles in the crowd are further in communication with one another.

In a further non-limiting embodiment of any of the foregoing systems, the vehicles are in communication with the server via a mobile device.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to crowd-sourcing information for predicting energy consumption of a vehicle.

Figure 1:
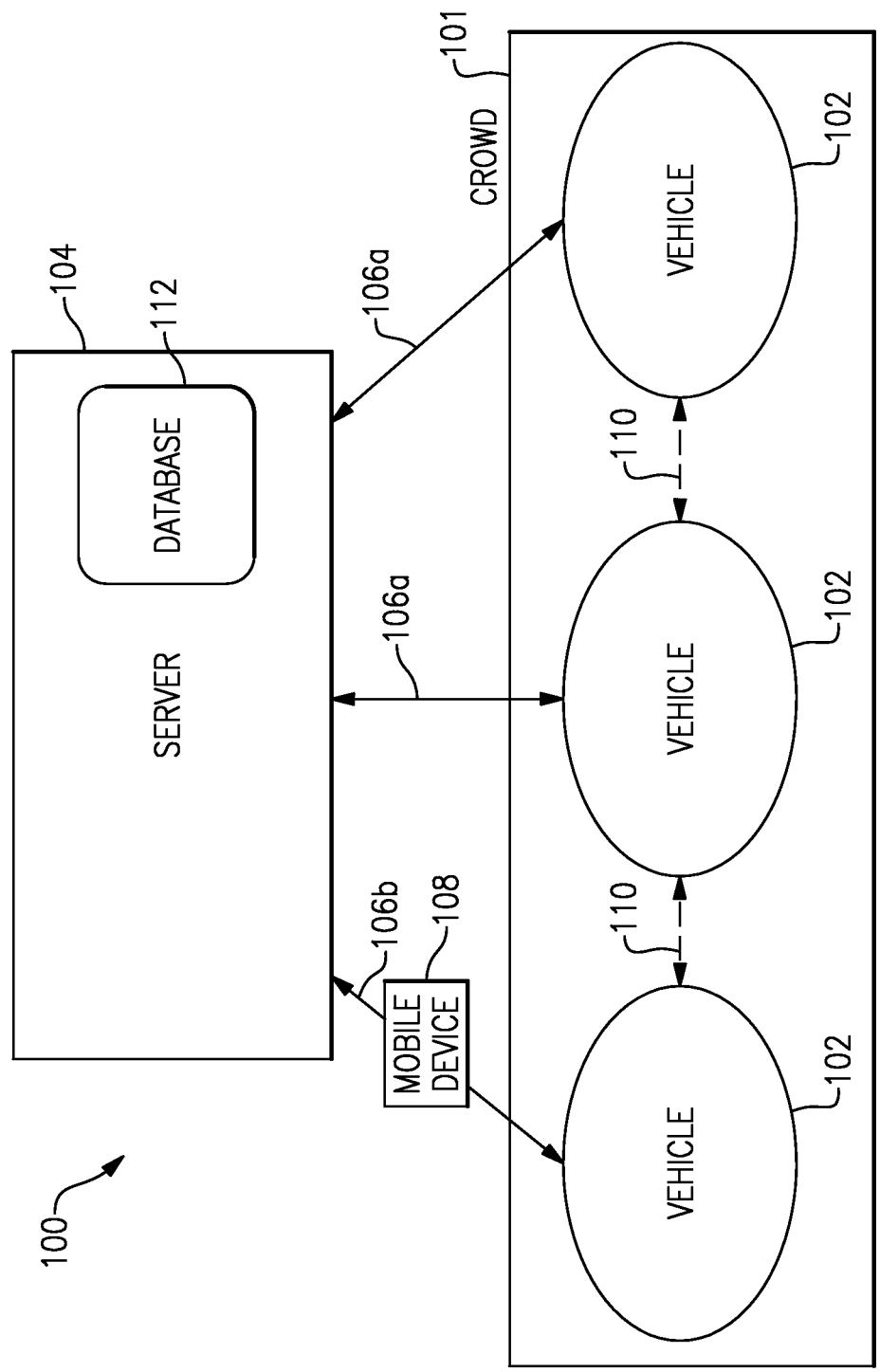
FIG. 1 schematically illustrates a system for predicting vehicle energy consumption based on crowd-sourced data.

FIG. 1 shows a schematic diagram of a system 100 for crowd-sourcing information to predict vehicle energy consumption. The system 100 includes a crowd 101 of one or more vehicles 102 and a server 104. In the example of FIG.

1, the crowd 101 includes three vehicles 102. In other examples, the crowd 101 can include more than three vehicles 102.

The example vehicles 102 are electrified vehicles, such as hybrid electric vehicles. Electrified vehicles can benefit from predictions of energy consumption. For example, electrified vehicles have a choice to use either the electrical motor or the gas engine to drive the vehicle forward (that is, to generate propulsion). Under certain circumstances, one could be more efficient than the other. However, as there is not an unlimited amount of energy for generating propulsion (and a regular hybrid electric vehicle must "generate" its electricity while driving), a smart vehicle that can predict future energy demand can more efficiently select when to use what kind of propulsion.

In the example system 100, the vehicles 102 communicate with the server 104 via server communication links 106. The server 104 can be a physical server or a cloud-based hosting service. In one specific example, the vehicle 102 communicates directly with the server 104 via a built-in communication link 106a. In another example, the server communication link 106b includes a brought-in mobile device 108, such as a driver's cellular phone.

The mobile device 108 can communicate with the vehicle 102 via a wireless connection, such as a Bluetooth® connection (Bluetooth SIG, Inc., Kirkland, Wash., USA), or a wired connection, such as by a universal serial bus (USB) cable. The mobile device 108 also communicates with the server 104 via a wireless connection, such by data transfer through the mobile device's 108 cellular data provider, for example 3G or 4G mobile networks. The mobile device 108 can include software to enable it to perform these communication functions.

The example vehicles 102 are operably connected to one another via vehicle communication links 110 such as DSRC in addition to, or instead of, being connected to the server 104 via the server communication links 106. It should be understood that the above description of the server communication links 106 is applicable to the vehicle communication links 110 as well. While the vehicle-to-vehicle communication is logically direct, it could be relayed through an additional intermediate cloud-based server (not shown), which would not be the server 104, but only provide routing capabilities between the vehicles 102. This relayed link could use either direct vehicle-to-infrastructure technology such as DSRC or the same kind of communication as the direct links 106.

The server 104 includes a database 112. The database 112 receives and stores data about the actual energy consumption of the vehicles 102 in the crowd 101. In one example, data transferred from vehicles 102 to the server 104 or to other vehicles 102 includes identifying information such as, for example, vehicle make or model, vehicle identification number (VIN), etc. In another example, data transferred from vehicles 102 includes identifying information about the road segments the vehicle 102 travels, such as geographical location, speed limit, number of lanes, road classification, number of lights or stop signs, etc. The additional data transferred to the server 104 enables data about the energy consumption of a vehicle 102 to be linked to identifying data of the vehicle 102 and/or the road segments that the vehicle 102 travelled.

The energy consumption data can further be time stamped and can include additional data, such as data about the weather or traffic conditions at the time and place of data collection. The server 104 and database 112 process the data to make predictions about vehicle 102 energy consumption.

The server 104 and database 112 may also include additional base energy consumption data for a particular vehicle 102. The base energy consumption data can be modified by the crowd-sourced data.

The server communication links 106 and vehicle communication links 110 can allow for two-way data transfer such that vehicles 102 can both send and receive data through the links 106, 110. That is, a vehicle 102 can send data about its actual energy consumption to the server 104 or another vehicle 102 and also receive data about its predicted energy consumption from the server 104 or the other vehicle 102.

Figure 2:
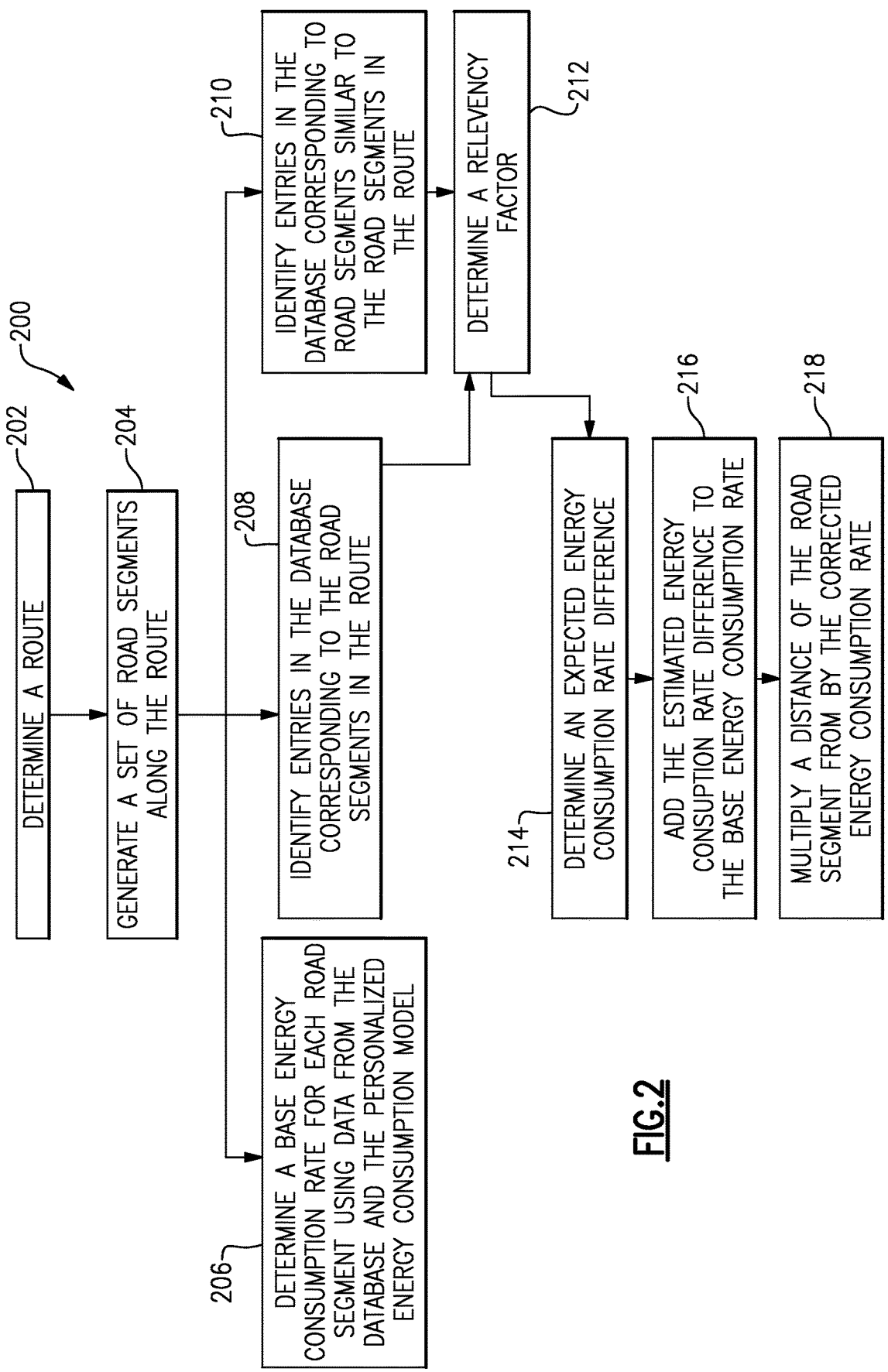
FIG. 2 illustrates another method of crowd-sourcing information to predict vehicle energy consumption using the system of FIG. 1.

Referring to FIG. 2, an example method 200 of predicting energy consumption data for vehicles 102 in a crowd 101 is shown. A Step 202 of the method 200 determines a route between a starting point (for example, based on a user-inputted starting point or a current location of the vehicle 102) and an ending point (for example, based on a user-inputted ending point or an ending point predicted by the method 200). In Step 204 the method 200 generates a set of road segments along the route. In Step 206, the method 200 determines a base energy consumption rate for a vehicle 102 on each road segment based on a personalized energy consumption model. The personalized energy consumption model can take into account, for example, driver habits, vehicle make and model, etc.

In Step 208, the method 200 identifies entries in the database 112 corresponding to the road segments in the route. In Step 210, the method 200 identifies entries in the database 112 corresponding to road segments similar to the road segments in the route. The data considered in Steps 208 and 210 may be sourced from the crowd 101. The method 200 will then execute Step 212 where the method 200 determines a relevancy factor. The relevancy factor prioritizes database 112 entries for use in future Step 214. The relevancy factor can depend on road characteristics, such as number of lanes, speed limit, road grade, road classification, number of traffic lights or stop signs, etc. The relevancy factor can also depend on a time since the data entries were collected. When the similarity of road characteristics is high and the time since the data entry was collected is low, the relevancy factor is the highest and the data is prioritized for use in Step 212. In one example, a predetermined number of data entries with the highest relevancy factors are used in Step 212.

In Step 214, the method 200 determines an expected energy consumption rate difference based on data from Steps 208 and/or 210. In one example, the expected energy consumption rate difference includes an amount of data used to produce the estimate to determine the accuracy of the estimate.

In Step 216, the method 200 adds the estimated energy consumption rate difference to the base energy consumption rate from Step 206 for each road segment to determine a corrected energy consumption estimate. In Step 218, the method 200 multiplies a distance of the road segment from Step 202 by the corrected energy consumption rate from Step 216 to determine the energy consumption of the vehicle 102 on the road segment.

Figure 3:
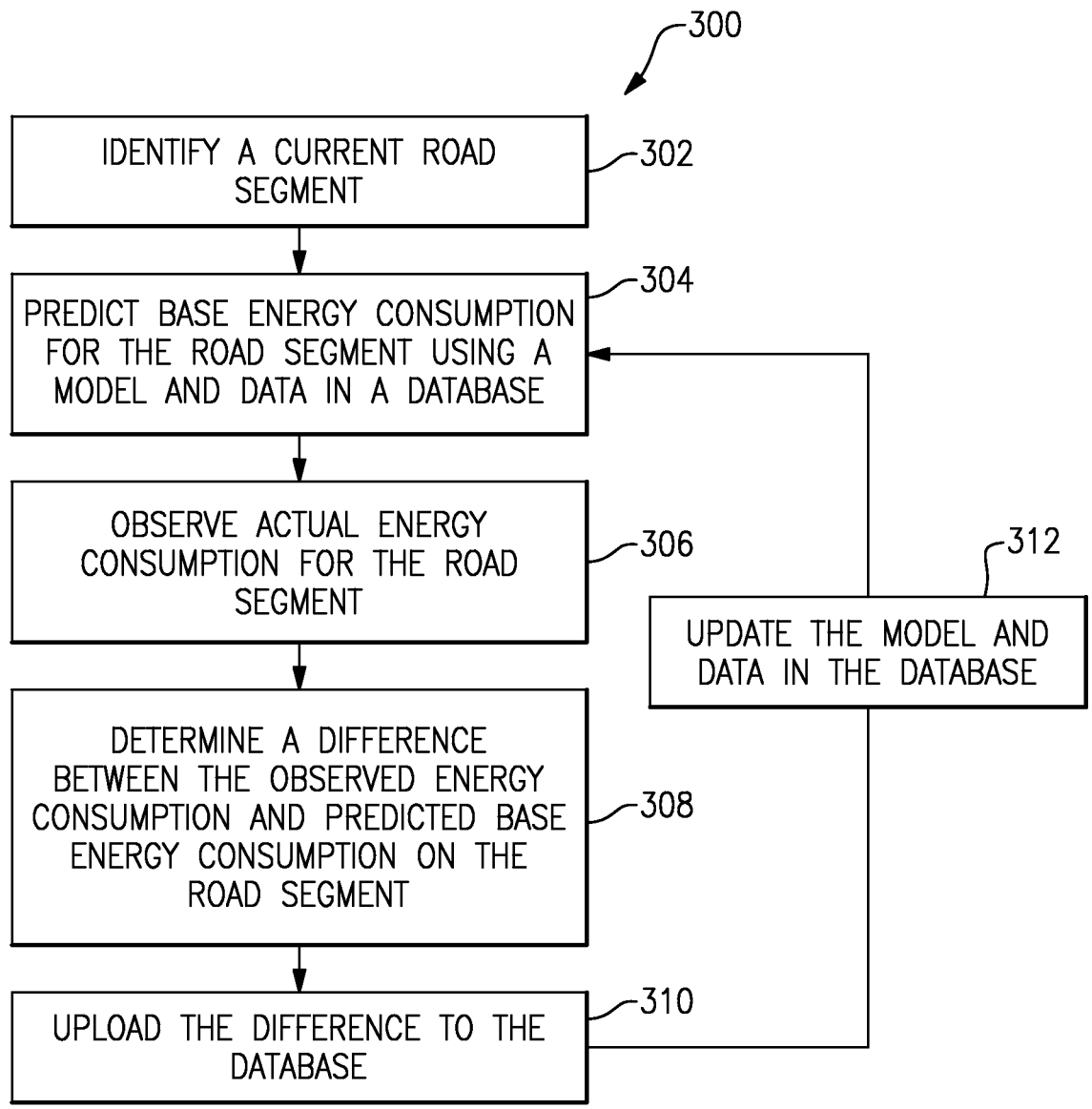
FIG. 3 illustrates a method of crowd-sourcing information to predict vehicle energy consumption using the system of FIG. 1.

Referring to FIG. 3 with continuing reference to FIG. 1, an example method 300 calculates and uploads the energy consumption difference for vehicles 102 in the crowd 101 and uploads that data to database 112. In Step 302, the method 300 identifies a road segment that a vehicle 102 is currently travelling on. In Step 304, the method 300 predicts a base energy consumption for the vehicle 102 travelling on the road segment based on a personalized energy consumption model. The prediction in Step 304 uses the same energy consumption model as 406. If the road segment is part of a known route, then the estimate from 304 will match the estimate from 406 for the corresponding segment. In Step 306, the method 300 observes the actual energy consumption of the vehicle 102 on the road segment. In Step 308, the method 300 determines a difference between the predicted base energy consumption and the actual energy consumption. In Step 310, the method 300 uploads the difference to the database 112. In Step 312, the method 300 updates the model in an ongoing learning process.

Figure 4:
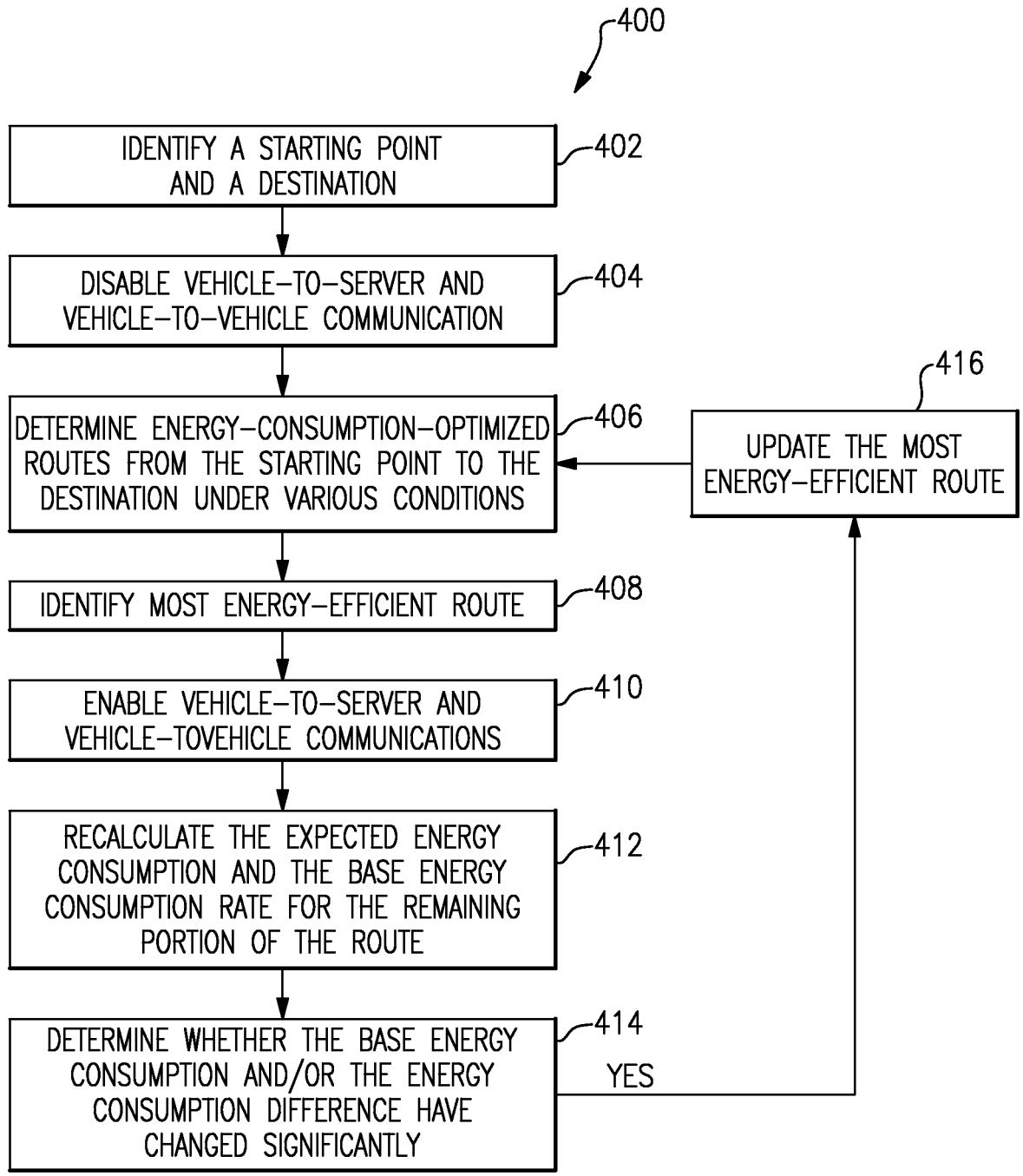
FIG. 4 illustrates a method of routing a vehicle using, for example, the methods of FIGS. 2 and 3.

FIG. 4 shows a method 400 of routing a vehicle 102 using the example methods 200, 300 (FIGS. 2 and 3). In Step 402, the method 400 identifies a starting point and a destination, which could be given by the user or predicted based on a location of the vehicle 102. Similarly, the destination could be given by the user or predicted by the method 400. In optional Step 404, the method 400 disables vehicle-to-server and vehicle-to-vehicle communication via the links 106, 110. In Step 406, the method 400 determines energy-consumption-optimized routes from the starting point to the destination under various conditions, for example, by the methods 200, 300 (FIGS. 2 and 3). The various conditions can be, for example, snowy conditions, windy conditions, normal conditions, traffic conditions, etc. In Step 408, the method 400 identifies the most energy-efficient route. In optional Step 410, the method 400 enables vehicle-to-server and vehicle-to-vehicle communication via the links 106, 110. In Step 412, the method 400 uses method 200 to update the energy consumption estimates for the remaining portions of the route. In particular, the method 400 determines an updated expected energy consumption difference using Step 214 and an updated base energy consumption using Step 206. In step 414, the method 400 determines whether the expected energy consumption difference and/or base energy consumption have change significantly. For example, information used to calculate the most energy-efficient route in Step 408 such as information about the traffic and weather conditions on the route or information about the driver may be compared to more current information to determine whether there has been a change. If so, in Step 416, the method 400 updates the most energy efficient route.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of crowd-sourcing energy consumption data for vehicles, comprising:
   at a server remote from a vehicle, selecting a route for the vehicle in response to a predicted energy consumption that is continually updated based on a difference between a previous predicted energy consumption and a previous base energy consumption, wherein the previous predicted energy consumption is based at least partially on data sourced from a crowd, and wherein the previous base energy consumption is based at least partially on a personalized energy consumption model which is based on at least one of driver habits and vehicle make or model;
   providing the route to the vehicle using a built-in communication link; and
   routing the vehicle along the route.

2. The method of claim 1, wherein the predicted energy consumption is additionally based on an energy consumption model.

3. The method of claim 2, further comprising updating the energy consumption model in response to the difference.

4. The method of claim 1, wherein the selecting includes selecting the route for the vehicle to travel from a starting position to a destination different than the starting position, the route selected from a plurality of possible routes.

5. The method of claim 4, further comprising calculating a current location of the vehicle and using the current location as the starting position for the route.

6. The method of claim 5, further comprising calculating a current road segment based on the current location of the vehicle.

7. The method of claim 6, further comprising selecting the route in response to identifying information about the vehicle, time, location, a road segment, or some combination of these.

8. The method of claim 1, wherein the selecting is further in response to at least one of a characteristic of the vehicle or a characteristic of a driver of the vehicle.

9. The method of claim 1, wherein the server communicates the route to a mobile device, and the mobile device communicates the route to the vehicle.

10. The method of claim 1, further comprising determining a predicted energy consumption by:
    generating a set of road segments;
    determining a base energy consumption rate for each road segment in the set of road segments;
    identifying entries in a database corresponding to each road segment;
    determining an expected energy consumption for each road segment in the set of road segments based on the entries in the database; and
    for each road segment in the set of road segments, multiplying a distance of the road segment by a sum of the expected energy consumption for each road segment and the base energy consumption for each road segment.

11. A method of routing a vehicle, comprising:
    changing a route for a vehicle in response to a predicted energy consumption for the vehicle when travelling the route, the predicted energy consumption based on a difference between a previous predicted energy consumption and a previous base energy consumption, the predicted energy consumption being continually updated, wherein the previous predicted energy consumption is based at least partially on data sourced from a crowd, and wherein the previous base energy consumption is based at least partially on a personalized energy consumption model which is based on at least one of driver habits and vehicle make or model.

12. The method of claim 11, further comprising dividing the route into a set of road segments, and performing the step of changing the route for each road segment in the set of road segments.

13. The method of claim 11, wherein the changing includes calculating a relevancy factor compares a first set of data entries corresponding to roads along the route and a second set of data entries corresponding to roads similar to the roads along the route, wherein the relevancy factor prioritizes energy consumption data for the vehicle.

14. The method of claim 13, wherein the calculating is with respect to one or more characteristics of the roads along the route.

15. The method of claim 14, wherein the characteristics include at least one of a geographical location, speed limit, number of lanes, road classification, number of traffic lights or stop signs.

16. The method of claim 13, wherein calculating the relevancy factor is with respect to a time since the data entries were collected.

17. The method of claim 13, wherein a predetermined number of data entries with the highest relevancy factor are used to predict the energy consumption.

18. The method of claim 11, further comprising changing the route to the most energy-efficient route.

19. The method of claim 11, further comprising determining a predicted energy consumption by:
   generating a set of road segments;
   determining a base energy consumption rate for each road segment in the set of road segments;
   identifying entries in a database corresponding to each road segment in the set of road segments;
   determining an expected energy consumption for each road segment in the set of road segments based on the entries in the database; and
   for each road segment in the set of road segments, multiplying a distance of the road segment by a sum of the expected energy consumption for each road segment and the base energy consumption for each road segment.

20. The method of claim 19, wherein determining the prediction energy consumption further includes calculating a relevancy factor based on a first set of data entries corresponding to roads along the route and a second set of data entries corresponding to roads similar to the roads along the route, wherein the relevancy factor prioritizes energy consumption data for the vehicle.

* * * * *